A. W. HINTZ AND F. W. PEDERSEN.
PROPELLING ATTACHMENT FOR TOY VEHICLES.
APPLICATION FILED MAR. 6, 1920.
1,365,914. Patented Jan. 18, 1921.
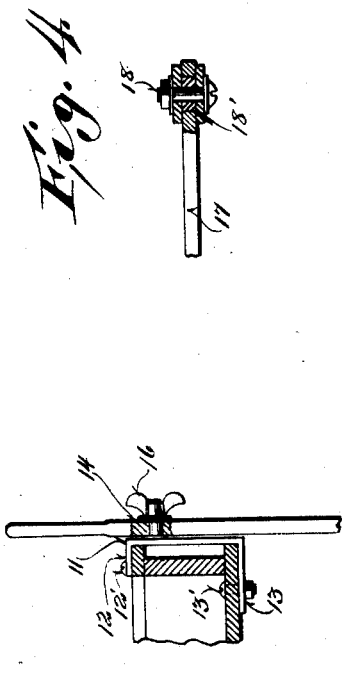
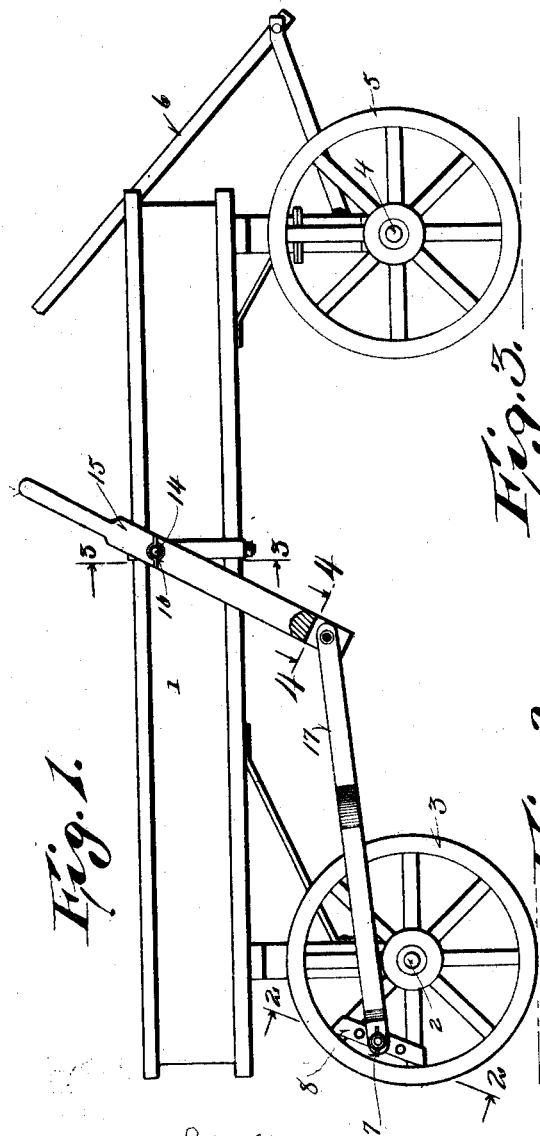
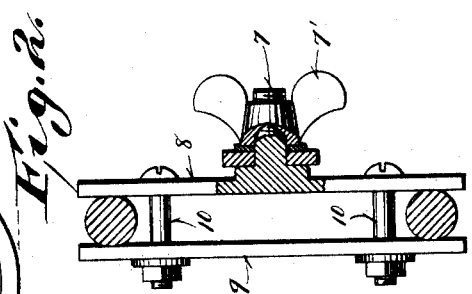
Inventors
Albert W. Hintz
Frederick W. Pedersen

UNITED STATES PATENT OFFICE.

ALBERT W. HINTZ AND FREDRICK W. PEDERSEN, OF MILWAUKEE, WISCONSIN, ASSIGNORS TO ALBERT W. HINTZ, EDWARD HINTZ, AND CHARLES HINTZ, ALL OF MILWAUKEE, WISCONSIN.

PROPELLING ATTACHMENT FOR TOY VEHICLES.

1,365,914.         Specification of Letters Patent.    Patented Jan. 18, 1921.

Application filed March 6, 1920. Serial No. 363,678.

*To all whom it may concern:*

Be it known that we, ALBERT W. HINTZ and FREDRICK W. PEDERSEN, citizens of the United States, and residents of Milwaukee, in the county of Milwaukee and State of Wisconsin, have invented certain new and useful Improvements in Propelling Attachments for Toy Vehicles; and we do hereby declare that the following is a full, clear, and exact description thereof.

Our invention refers to toy vehicles, having for its object a simple, economical and durable attachment for propelling such vehicles. Other objects are:

To provide in connection with a standard coaster vehicle of the draft type, means for detachably securing to the body thereof a lever, together with means for detachably securing to one of the rear wheels thereof a crank pin for link connection with the lever.

To provide a driving crank pin for the rear wheel of such vehicle, which crank pin can be adjusted to the spokes of the wheel, irrespective of its size.

To provide a hand actuated propelling attachment for a toy vehicle, which can be readily fitted to a standard type of such vehicle without the aid of a skilled mechanic.

With the above and other minor objects in view, the invention consists in certain peculiarities of construction, combination of parts as are herein set forth with reference to the accompanying drawings and subsequently claimed.

In the drawings:

Figure 1 represents a side elevation of a standard coaster vehicle having attached thereto a propelling mechanism embodying the features of our invention.

Fig. 2 is an enlarged detailed cross sectional view of the preferred form of crank pin attaching means, the view being partly in section as indicated by the line 2—2 of Fig. 1.

Fig. 3 is a detailed cross sectional view through a portion of the body of the vehicle showing means for attaching a propelling lever to said body, and Fig. 4 is a detailed cross sectional view through the lower portion of the propelling lever, illustrating a link connection between said lever and the rear wheel of the vehicle.

Referring by characters to the drawing, 1 represents the body of a toy wagon having a fixed axle 2, upon which is mounted the usual spoke wheels 3. The vehicle is also provided with a front pivotal axle 4, which carries the usual wheel 5, said axle having attached thereto a draft and steering handle 6 whereby the vehicle is rendered dirigible.

All of the above mentioned structure forms no part of our invention. In order to readily attach to this vehicle a driving mechanism, we provide a crank pin 7, which projects from the clamping plate 8, the same being adapted to fit against the outer face of a companion set of spokes of the rear wheel. A combination clamping plate 9 is fitted to the rear spaces of the companion spokes and the second clamping plates are drawn together firmly by nuts and bolts 10, as best shown in Fig. 2. Thus it will be seen that this crank-pin can be fastened to the rear wheel of the vehicle irrespective of the diameter of the wheel, whereby adjustment is rendered possible to fit the crank-pin to wheels of various dimensions and also to vary the throw of the crank-pin with respect to the axis of the wheel.

A strap 11 is fitted to one of the side panels of the vehicle body and said strap is provided with inwardly extended feet 12 and 13, as best shown in Fig. 3. The upper foot 12 is secured by a screw 12' and a lower foot 13 of the strap is confined by a bolt 13', which passes through the body bottom whereby the strap is firmly held in place to resist driving strain. The strap 11 has projecting therefrom a fulcrum stud 14, upon which is pivotally mounted a hand-lever 15, the same being confined by a wing nut 16, which is in threaded union with the fulcrum stud. Thus the parts can be readily assembled and dismantled from the vehicle when desired.

The lower end of the hand-lever 15 is slotted for the reception of one end of a driving link 17, which is confined within the bifurcated end of the lever by means of a bolt 18, having mounted thereon a spacing thimble 18'. The rear end of the link is apertured for engagement with crank-pin 7 and this end is confined by a wing nut 7'. Thus it will be seen that the parts can all be readily assembled and knocked down without the aid of a skilled mechanic and that when said parts are fitted to the standard vehicle, the operator may propel the vehicle while resting in the body, by manipulating the hand-lever 15. This apparatus is particularly intended as a substitute for the ordinary method now used in propelling these vehicles, which consists primarily in the occupant resting a part of his weight upon the body of the vehicle and using one foot to propel.

While we have illustrated a mechanism for carrying out our invention in all its detail, for attaching to a standard vehicle, obviously such details may be varied within the scope of the claim as would be interpreted by those skilled in the art.

Attention is also directed to the fact that the propelling mechanism will permit the operator to reverse and back the vehicle and also permit him to manipulate the device so that it will act as a brake in coasting the vehicle.

We claim:

In a propelling attachment for toy vehicles having dirigible front wheels and fixed rear spoke wheels, the combination of a strap secured to the vehicle body, having a fulcrum stud extending therefrom, a hand-lever pivotally mounted upon the stud, an adjustable clamping plate fitted to the spokes of one of the rear wheels, means for securing the clamping plate to the spokes, a crank-pin extending from the clamping plate, and a link connecting the crank-pin and lower end of the hand-lever.

In testimony that we claim the foregoing we have hereunto set our hands at Milwaukee, in the county of Milwaukee and State of Wisconsin.

ALBERT W. HINTZ.
FREDRICK W. PEDERSEN.